US009637388B2

(12) United States Patent
Kurungot et al.

(10) Patent No.: US 9,637,388 B2
(45) Date of Patent: May 2, 2017

(54) PROCESS FOR PREPARATION OF NANOPOROUS GRAPHENE AND GRAPHENE QUANTUM DOTS

(71) Applicant: Council of Scientific & Industrial Research, New Delhi (IN)

(72) Inventors: Sreekumar Kurungot, Pune (IN); Thangavelu Palaniselvam, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/893,658

(22) PCT Filed: May 26, 2014

(86) PCT No.: PCT/IN2014/000354
§ 371 (c)(1),
(2) Date: Nov. 24, 2015

(87) PCT Pub. No.: WO2014/188454
PCT Pub. Date: Nov. 27, 2014

(65) Prior Publication Data
US 2016/0130151 A1    May 12, 2016

(30) Foreign Application Priority Data
May 24, 2013  (IN) .......................... 1564/DEL/2013

(51) Int. Cl.
*C01B 31/04*    (2006.01)
*B01J 20/20*    (2006.01)
*H01M 4/96*    (2006.01)
*B82Y 40/00*    (2011.01)

(52) U.S. Cl.
CPC ........... *C01B 31/0484* (2013.01); *B01J 20/20* (2013.01); *C01B 31/0438* (2013.01); *C01B 31/0446* (2013.01); *H01M 4/96* (2013.01); *B82Y 40/00* (2013.01); *C01B 2204/02* (2013.01); *C01B 2204/065* (2013.01); *C01B 2204/32* (2013.01); *Y02E 60/324* (2013.01); *Y10S 977/774* (2013.01)

(58) Field of Classification Search
None
See application file for complete search history.

(56) References Cited

FOREIGN PATENT DOCUMENTS

CN    102176382 A  *  9/2011
CN    102 660 270     9/2012

OTHER PUBLICATIONS

International Search Report for Application No. PCT/IN2014/000354 dated Sep. 17, 2014.
(Continued)

*Primary Examiner* — Guinever S Gregorio
(74) *Attorney, Agent, or Firm* — Workman Nydegger (57) ABSTRACT

The present invention discloses a simple and easily scalable process for preparation of two potentially value added carbonaceous materials from graphene. The invention further discloses simultaneous preparation of graphene quantum dots (GQDs,) and porous graphene (pGr) from graphene. The invention further relates to nitrogen doped porous graphene having excellent activity towards electrochemical oxygen reduction reaction (ORR).

5 Claims, 7 Drawing Sheets

(56) References Cited

OTHER PUBLICATIONS

Lingling Li., et al.: "Focusing on luminescent graphene quantum dots: current status and future perspectives", *Nanoscale*, vol. 5, No. 10, Jan. 10, 2013, p. 4015, XP055136799, ISSN: 2040-3364, DOI: 10.1039/c3nr33849e.
Paola Russo, et al.: "Femtosecond laser ablation of highly oriented pyrolytic graphite: a green route for large-scale production of porous graphene and graphene quantum dots" *Nanoscale*, vol. 6, No. 4, Dec. 6, 2013, p. 2381, XP055137277, ISSN: 2040-3364, DOI: 10.1039/c3nr05572h, p. 2381-2385.
Thangavelu Palaniselvam, et al.: "An efficient oxygen reduction electrocatalyst from graphene by simultaneously generating pores and nitrogen doped active sites" *Journal of Materials Chemistry*, vol. 22, No. 45, Sep. 24, 2015, p. 23799, XP055136917, ISSN: 0959-9428, DOI: 10.1039/c2jm35128e.
Thangavelu Palaniselvam, et al.: "Nanoporous graphene by quantum dots removal from graphene and its conversion to a potential oxygen reduction electrocatalyst via nitrogen doping", *Energy and Environmental Science*, vol. 7, No. 3, Dec. 2, 2013, p. 1059, XP055136810, ISSN: 1754-5692, DOI: 10.1039/c3ee43648a, p. 1059-1062.
Xuejiao Zhou, et al.: "Photo-Fenton Reaction of Graphene Oxide: A New Strategy to Prepare Graphene Quantum Dots for DNA Cleavage" *ACS Nano*, vol. 6, No. 8, Jul. 19, 2012, pp. 6592-6599, XP055136812, ISSN: 1936-0851, DOI: 10.1021/nn301629v, Methods; p. 6593.

\* cited by examiner

PROCESS FOR PREPARATION OF NANOPOROUS GRAPHENE AND GRAPHENE QUANTUM DOTS

FIELD OF THE INVENTION

The present invention relates to a simple and easily scalable process for preparation of two potentially value added carbonaceous materials graphene quantum dots (GQDs,) and porous graphene (pGr) from graphene. Particularly, the present invention relates to simultaneous preparation of graphene quantum dots (GQDs,) and porous graphene (pGr) from graphene. The invention further relates to doping of nitrogen into porous graphene having excellent activity towards electrochemical oxygen reduction reaction (ORR).

BACKGROUND AND PRIOR ART OF THE INVENTION

Development of nitrogen doped carbonaceous materials, especially graphene (Gr) with or without metal becomes a well known strategy to replace the platinum based catalysts in the energy storage and conversion devices. Graphene with high surface area (~2650 $m^2$ $g^{-1}$), high mechanical stability and high electron mobility etc. plays a vital role as a support and/or catalyst in the energy conversion devices. Being a zero band-gap material, it is necessary to tune the band gap of Graphene to facilitate its application in photovoltaics and optoelectronics. This can be achieved practically by the conversion of two dimensional Graphene into graphene nano ribbons (GNRs) and zero dimensional graphene quantum dots (GQDs) due to their quantum confinement and edge effects.

The recent efforts are intensively focused on the preparation of GQDs by bottom-up (refers to synthesis of GQDs by chemical carbon-carbon coupling reaction) and top-down (refers to cutting of Gr sheets into the GQDs) methods for different applications. Most recent reports demonstrated the nitrogen doped graphene quantum dots (NGQDs) as a non-Pt oxygen reduction reaction (ORR) catalyst. Although, the aforementioned reports are effective for the preparation of GQDs, the yield of these GQDs has to be increased for practical application. Moreover, in all these cases, hazardous concentrated acids have been employed to cut down the carbon source into the GQDs and excluded its resulting parent material (i.e. carbon source). Hence, an efficient and environmentally benign method for the preparation of GQDs with better yield is highly desirable.

Further, porous graphene (pGr) has also gained much attention recently in the field of nano electronics as similar to Graphene. Interestingly, the band gap of the Graphene can be tuned as similar to the band gap of $TiO_2$ (3.2 eV) by making holes on Graphene.

Recently, the inventors group has demonstrated a versatile method for drilling nano holes on graphene assisted by pre-formed $Fe_2O_3$ nanoparticles and conversion of the latter to $Fe_3C$ through carbon spillover from Graphene. Inclusion of multi carbon vacancy along the pore openings of the two dimensional Graphene could be utilized for imparting ORR activity in the system through effective nitrogen doping.

However, the method proposed by the inventor has limitations like controlling the sizes of the pores within few nanometers and maintaining the pore distribution homogeneously throughout the surface of Graphene and reducing the wastage in the process.

Considering this long standing need of the prior art, the inventors have now come up with an environmentally friendly process without any wastage of carbonaceous material which gives the nanoporous graphene without any metal contamination and extensive damage to the Graphene framework, utilizing mild reagents and reaction conditions.

OBJECTS OF THE INVENTION

The object of the current invention is to provide a simple and scalable process to prepare the porous graphene (pGr) and graphene quantum dots (GQDs) simultaneously from graphene with no wastage of carbonaceous material.

The other object of the invention is to provide a process which gives the nanoporous graphene without any metal contamination and extensive damage to the graphene framework.

The other object is to prepare nitrogen doped porous graphene having excellent activity towards electrochemical oxygen reduction reaction (ORR).

SUMMARY OF THE INVENTION

Accordingly, the present invention provides an in-situ process for simultaneous synthesis of nanoporous graphene (pGr) and photo luminescent graphene quantum dots (GQDs) with no wastage of carbonaceous material comprising;
  i. dispersing graphene with 25-35% hydrogen peroxide ($H_2O_2$) at room temperature ranging between 25-35° C. followed by increasing the temperature to 60 to 70° C. for 24 to 72 hrs to obtain a mixture of porous graphene (pGr) and graphene quantum dots (GQDs);
  ii. filtering the resulting mixture to obtain the solution of GQDs-72 as filtrate and residue of pGr;
  iii. drying the residue as pGras obtained in step (ii) at a temperature in the range of 40° C-60° C. for 1-3 h;
  iv. dialysing the filtrate as obtained in step (ii) in dialysis bag for 1-3 days at 27 to 30° C. to obtain solution of GQD;
  v. optionally, nitrogen doping of the porous graphene as obtained in step (iii) to obtain nitrogen doped porous graphene.

In an embodiment of the present invention the average size of graphene quantum dots as obtained in step (iv) in a single layer is 3-5 nm.

In one embodiment of the present invention the BET surface area of pGr as obtained in step (iii) is in the range of 204 to 240 $m^2$ $g^{-1}$.

In another embodiment of the present invention the nitrogen doping of the porous graphene surface (pGr)was carried out by, mixing of ethanolic solution of porous graphene (pGr) as obtained in step (iii) with 1, 10 Phenanthroline mixture at 27 to 30° C. for a period ranging between 20-24 hrs followed by evaporating the solvent by thermal evaporation at temperature ranging between 50 to 60° C. for a period ranging between 10-12 hrs to obtain the composite material subsequently heating at temperature ranging between 800 to 900° C. for a period ranging between 1-3 hrs in a furnace saturated with inert atmosphere and cooling, washing to obtain nitrogen doped porous graphene.

In another embodiment of the present invention nitrogen doped porous graphene nano pores (pGr) and GQD are useful for gas separation, water desalination, for the single atom doping (Pt, Co and In), nano-electronics and energy applications such as Li-ion batteries Li-air battery, solar cells, super capacitors, gas sensors and polymer electrolyte membrane fuel cells (PEMFCs).

Figure 2:
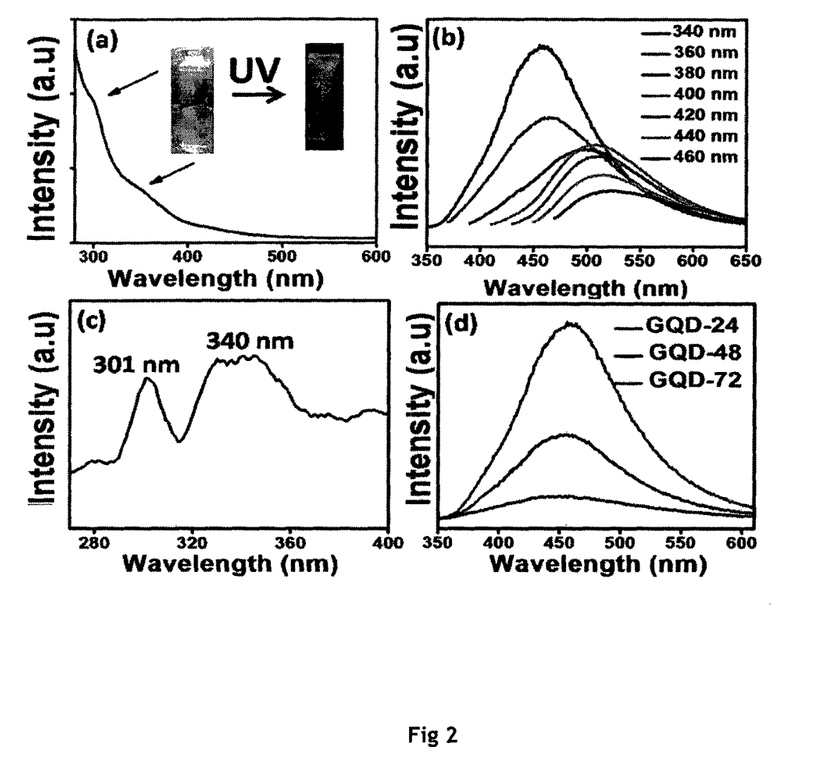
FIG. 2 depicts (a) UV-Vis spectra of GQD-72. (b) Photoluminescent excitation (PLE) spectra of GQD-72. (c) Photoluminescent spectra of GQD-72 in water. (d) Comparison of PL spectra of different GQDs (GQD-24, 48 and 72) at the excitation wavelength of 340 nm.
Figure 9:
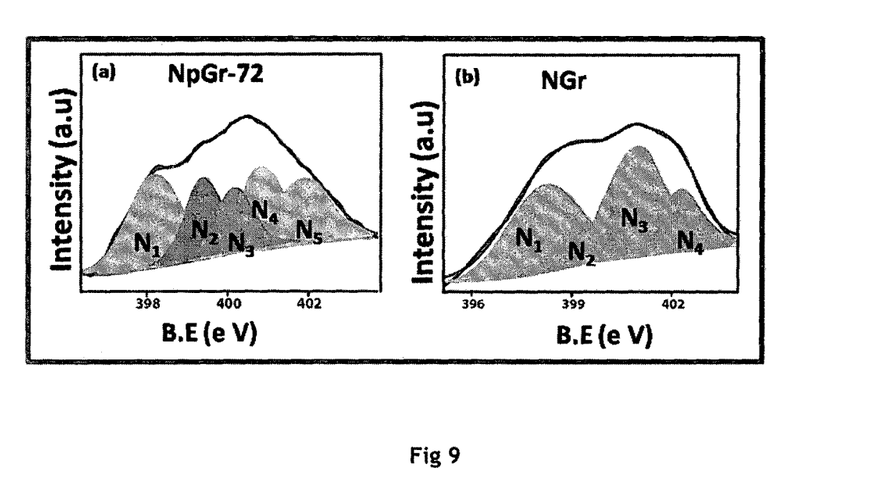
FIG. 9 Deconvoluted N1s spectra of NpGr-72 and NGr. The various nitrogen moieties as designated for the samples are as follows: (a) NpGr-72: N1 (Pyridinic), N2 (Pyrrolic), N3 (Graphitic), N4 (Quaternary) and N5 (Pyridinic N+O−); (b) NGr: N1 (Pyridinic), N2 (Pyrrolic), N3 (Graphitic) and N4 (Pyridinic N+O−).

For an effective comparison, the amount and chemical nature of nitrogen in NGr is also investigated along with NpGr-72. The estimated nitrogen contents in NGr and NpGr-72 by EDAX are 4.2 and 7.8 wt. %, respectively. This trend is in accordance with the expected greater extent of unsaturated carbon moieties along the pore openings of NpGr-72, which is expected to accommodate more nitrogen atoms compared to the case of using pristine Gr. FIG. 9 shows the deconvoluted XPS N1s spectra of NpGr-72 and NGr. The N1s spectra of NpGr-72 in FIG. 2a show the presence of five different peaks at 398.4 ($N_1$), 399.4 ($N_2$), 400.3 ($N_3$), 401.1 ($N_4$) and 402.4 eV ($N_5$) corresponding to pyridinic, pyrrolic, graphitic, quaternary nitrogens and nitrogen bound with oxygen (pyridinic N$^+$O$^-$) respectively.

Similarly, the deconvoluted N1s spectra of NGr in FIG. 9b show the presence of four different peaks at 398.5 ($N_1$), 399.3 ($N_2$), 400.6 ($N_3$), and 402.2 ($N_4$) corresponding to pyridinic, pyrrolic, graphitic and nitrogen bound with oxygen (pyridinic N$^+$O$^-$) respectively.

Interestingly, compared to NpGr-72, the pyrrolic/pyridone contribution is significantly low in the case of NGr. Therefore, the co-existence of pyridinic and pyrrolic/pyridone types of nitrogen in the case of NpGr-72 is expected to contribute together towards the observed enhanced ORR activity of the system. Such a desired enhancement in the type and density of the nitrogen doped active sites could be established due to the success in creating unsaturated carbon centers along the substrate by engraving nanometer sized pores without making any adverse effect on its 2-D architecture.

DETAILED DESCRIPTION OF THE INVENTION

Graphene which is a two dimensional sp$^2$ carbon network, due to its high carrier mobility, mechanical flexibility and chemical stability finds wide application in development of high performance in electronics and related fields. However, apart from the distinctive high surface area and mechanical stability of graphene, the effects of edge sites are very significant in the electrocatalytic process. Creation of porosity on the graphene surface is technically challengeable, specially in the context of controlling the sizes of the pores within few nanometers and maintaining the pore distribution homogeneously throughout the surface of Graphene (Gr).

In view of the above and the shortcomings in prior art processes to provide nanoporous graphene without any metal contamination and extensive damage to the Gr framework, the inventors provide herein a simple and scalable process for functionatization of graphene using a suitable oxidizing agent that meets the desired objective of the instant invention advantageously.

The present invention provides an in-situ synthesis of graphene quantum dots (GQDs) and porous graphene (pGr) simultaneously by simple hydrogen peroxide (H$_2$O$_2$) functionalization of graphene (Gr) under ambient condition. The process helps to knock out small pieces of Gr through epoxide formation, which subsequently resulted into the generation of GQD and pGr simultaneously.

The use of hydrogen peroxide as oxidizing agent has two advantages, viz. (i) oxidation can be carried out at ambient temperature and (ii) does not incorporate foreign elements in to the carbon surface.

The present invention provides a simple, scalable, in-situ process for simultaneous synthesis of well-structured nanoporous graphene (pGr) and photo luminescent graphene quantum dots (GQDs) with no wastage of carbonaceous material comprising;
  i. etching graphene with H2O2 (30%) at a temperature in the range of 27° C.-70° C. and maintaining for 24-72 hours to obtain a mixture of pGr and GQDs;
  ii. filtering the resulting mixture to obtain the solution of GQDs and residue of pGr-72;
  iii. drying the residue (i.e. pGr-72) at a temperature in the range of 40° C.-60° C. for 1-3 h;
  iv. dialysing the filtrate obtained in step (ii) in a dialysis bag for about 3 days to obtain solution of GQD-72.

Accordingly, Gr was dispersed in H$_2$O$_2$ (30%) solution and sonicated for about 10 min. at room temperature followed by increasing the temperature of the reaction mixture to 70° C. and maintaining for 72 h. Subsequently, the resulting mixture was filtered by a fitter paper having a pore size of 0.44 μm (Rankem Chemicals) and the residue (i.e.

pGr-72) was dried at a temperature in the range of 45-55° C. for about 3 h and preserved for further analyses. Total yield of pGr-72 was estimated which is ~70%. The filtrate collected was allowed for dialysis in a dialysis bag for about 3 days to obtain aqueous solution of GQD-72 which was conserved for further analysis.

The photo luminescent (PL) quantum yield of GQD formed after 72 h of the oxidative treatment (GQD-72) was 15.8%, Table 1 below provide comparative yield of GQD's with the yield of PL GQD-72 indicating the remarkable improvement in PL quantum yield by th'e process of the instant invention.

TABLE 1

Comparison table of yield of GQDs.

| Author | Method | PL Quantum yield (%) |
| --- | --- | --- |
| Pan. et al. (D. Pan, J. Zhang Z. Li, Wu, M.; *Adv. Mater*) 2010, 22, 734.) | Hydrothermal method | 6.9 |
| S. Zhu. et al. (S. Zhu, J. Zhang C., Qiao, S. Tang, Y. Li, W. Yuan, B. Li, L. Tian, F Liu,. R. Hu, H. Gao, H. Wei, H. Zhang, H. Sun, B. Yang, *Chem. Commun.* 2011, 47, 6858. | Solvothermal method | 11.4 |
| Y. Dong. et al.(Y. Dong, J, Shao. C. Chen, H. Li, R. Wang, Y. Chi, X. Lin, G. Chen, *Carbon* 2012, 50,, 4738.) | Carbonization of citric acid | 9.0 |
| M. Zhang. et al(M. Zhang, L. Bai, W. Shang, W. Xie, H. Ma, Y. Fu, D. Fang, H. Sun, L. Fan, M. Han, C. Liu, S. Yang, *J. Mater. Chem.*, 2012, 22, 7461.) | Electrochemical method | 14.0 |
| L. Lin. et al (L. Lin, S. Zhang, *Chem. Commun.*, 2012, 48, 10177.) | Exfoliation of MWCNTs | 6.53 |
| Present study | $H_2O_2$ functionalization | 15.8 |

The controlled removal of GQDs from the graphene surface makes the latter more porous and allows for effective surface modifications to bring in the desired property characteristics at the surface.

Graphene used in the process of the invention is synthesized by pyrolysis of graphene oxide (GO) in argon (Ar) atmosphere at 700-900° C. for 1-3 h.

GO is synthesized by improved Hummer's method. Accordingly, a mixture of potassium permanganate ($KMnO_4$) and graphite powder (6:1 g ratio) is added slowly to the acid mixture of con. $H_2SO_4$ and $H_3PO_4$ (9:1 ratio) with mechanical stirring at 0° C. and the temperature is allowed to increase to a temperature in the range of 45-55° C. and maintaining for about 12-14 hrs. This is followed by adding 30% $H_2O_2$ in ice water to the reaction mixture to stop the oxidation of the reaction. The mixture is further centrifuged, washed and used for further reaction.

Figure 1:
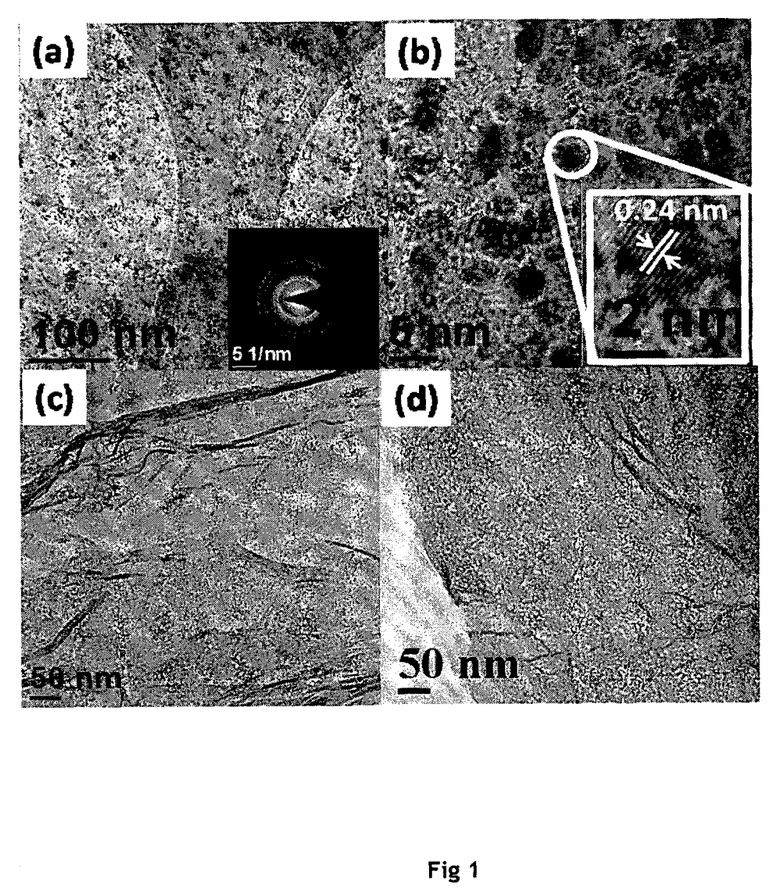
FIG. 1 depicts (a-b) HRTEM images of GQD-72 in different magnifications. Inset of (a) is the diffraction pattern of GQD-72 which represents the mono crysatilinity of the material. Inset of (b) is the higher magnification image of GQD-72, giving the corresponding lattice fringes possessing d value of 0.24 nm. (c-d) represents the HRTEM images of pGr-72 in different, magnifications; well distributed nanopores and the characteristic feature of the graphene surface are clearly visible from these images.
Figure 3:
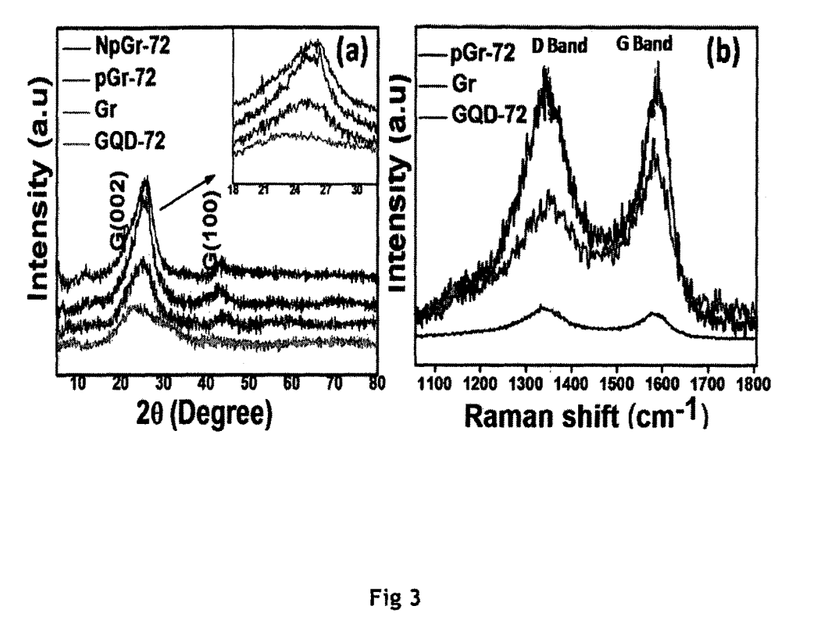
FIG. 3 depicts XRD patterns of the prepared samples (b) Raman spectra of Gr, pGr-72 and GQD-72.

In the present invention, GQDs solution obtained after dialysis show uniform dispersion of quantum dots with average particle size of graphene quantum dots in a single layer is 3-5 nm. (FIG. 1a). The higher magnification image (inset of FIG. 1b with d value of 0.24 nm (1120 plane of graphene) and diffraction pattern (inset of FIG. 1a) emphasizes the higher crystallinity of the GQD-72 as similar to graphene. Further, the aqueous solution of GQD-72 shows a yellow color (inset of FIG. 3a) and emits a strong green luminescence under the UV light which is likely to be due to the luminescent carbon particles. The photoluminescent (PL) spectra of GQD-72 (3b) show the strongest emission at 457 nm with the Stokes shift of 117 nm on an excitation wavelength of 340 nm. The energy difference (ΔE) between σ and π orbital which predicts the ground state multiplicity of carbene must be less than 1.5 eV for the triplet ground state. The calculated ΔE for the green luminescence is observed at 0.47 eV, which ensures that the synthesized GQD is similar to the carbene with triplet multiplicity.

The process of $H_2O_2$ oxidative treatment results in etching of the graphene (Gr) surface resulting in increased proportion of nanopores of smaller dimensions in the system. Graphene exhibits a relatively broad pore size distribution within the range of 5 to 9 nm. In addition to the 5 nm sized pores, more pores with an average size of 0.7-3 nm are also found to be present on the graphene surface, pGr-72. The high surface density of the nanopores present on pGr-72 was ensured from hydrogen sorption-desorption capacity. pGr-72 showed nearly two times higher storage capacity as compared to pGr-48 which ensures the better surface density of the nanopores present on pGr-72. The BET surface area of pGr is 204 $m^2$ $g^{-1}$.

HRTEM images reveal the presence of nano sized pores on Gr surface while these are absent in the case of pure Gr sheets (FIG. 1e-1f). The 5 nm average sized pores are in tune with the average size of GQD-72 indicating the derivation of these GQDs from the Gr surface. Moreover, the pore size distribution profile of pGr-72 which augments the presence of 5 nm sized pores with uniform distribution on Gr confirms the formation of GQDs from Gr.

The nanopores on the graphene surface concomitantly enriches the unsaturated carbon valancies thus providing more edge sites which act as a trapping site for other heteroatom doping. This provides a convenient way to enhance the concentration of nitrogen during the doping process and also to establish greater proportions of the desired co-ordinations which are active for facilitating ORR.

The present invention provides a process for nitrogen doping of the porous graphene surface (pGr-72) having excellent activity towards electrochemical oxygen reduction reaction (ORR), comprising;

i. Mixing of ethanolic solution of porous graphene (pGr-72) with 1, 10 Phenanthroline at room temperature 30° C.) until complete diffusion of phen in to the cavity of pGr;

ii. evaporating the solvent by thermal evaporation to obtain the composite material followed by heating at 900° C. in a furnace saturated with inert atmosphere; and iii. cooling the pyrolysed product (NpGr-72), washing and storing.

The higher amount of the doped nitrogen and its chemical environment of NpGr-72 identified by energy dispersive X-ray analysis (EDAX) show the presence of pyridinic, pyrrolic, graphitic, quaternary nitrogens and nitrogen bound with oxygen (pyridinic $N^+O^-$) respectively; preferably pyridinic and pyrrolic/pyridone type nitrogens doped directly at the defect sites along the pore openings contributing to enhanced ORR activity of NpGr-72.

In order to understand the influence of surface porosity of Gr for nitrogen doping towards the establishment of efficient catalytic sites for ORR, cyclic voltammetry was carried out for NpGr-72 in 0.1 M KOH solution (saturated with Oxygen) and the performance was compared with non-porous nitrogen doped graphene (NGr), pGr-72 and commercial 20 wt % PtC (E-TEK). Accordingly, NpGr-72 exhibited the cathode current onset at +0.02 V, which corresponds to an appreciable reduction in the overpotential by 50 and 90 mV compared to NGr and pGr respectively.

The nearly 4-electron transfer process as quantified from the K-L plots and the significantly lower percentage of $H_2O_2$ as estimated from the ring current clearly validates the existence of the preferred oxygen reduction kinetics involving the major contribution from the direct reduction of oxygen into water in the present system. Even though NpGr-72 exhibits ORR with higher overpotential compared to the commercial E-TEK (20 wt. % Pt/C) as shown in FIG. 13b, the overpotential difference between these two catalysts is significantly low (60 mV) compared to the previous reported data.

The pGr-72 is observed to be electrochemically more stable compared to its commercial Pt counterpart in alkaline medium up to 2500 cycles. The potential cycling causes the dissolution and sintering of Pt nanoparticles in the case of E-TEK whereas degradation of active sites in NpGr-72 is less prominent due to the stable coordination of nitrogen with the graphene moiety.

Graphene with well distributed nano pores as produced by the current method may be used as membrane for gas separation, water desalination, for the single atom doping (Pt, Co and In), nano-electronics and energy applications such as Li-ion batteries Li-air battery, solar cells, super capacitors, gas sensors and polymer electrolyte membrane fuel cells (PEMFCs). The GQD-72 obtained in the process with its unique luminescent properties, display its potential application in nano electronics.

Thus, the present invention disclose a simple and easily scalable process for developing two potentially value added products, GQD-72 and porous graphene pGr-72 having greater prospects in nano electronics and energy applications.

The Gr with well distributed nano pores as produced by the current method may be used as membrane for gas separation, water desalination, for the single atom doping (Pt, Co and In), nano-electronics and energy applications such as Li-ion batteries Li-air battery, solar cells, super capacitors, gas sensors and polymer electrolyte membrane fuel cells (PEMFCs).

EXAMPLES

Following examples are given by way of illustration therefore should not be construed to limit the scope of the invention.

Experimental Methodology

1. Preparation of Graphene Oxide (GO)

The mixture of potassium permanganate ($KMnO_4$) and graphite powder (6:1 g ratio) was added slowly to the acid mixture of conc. $H_2SO_4$:$H_3PO_4$ (9:1 ratio) (180 ml:20 ml) with mechanical stirring at 0° C. Further, temperature of the reaction mixture was allowed to increase up to 45° C. for 1 h followed by increase up to 55° C. and maintained the same temperature for 12 h. Subsequently, 3 ml of 30% $H_2O_2$ in ice water was added to the reaction mixture to stop the oxidation of the reaction. The mixture was subjected to centrifugation at 12000 rpm and the supernatant solution was decanted away. The resulting material was subjected to the multiple washings with water, ethanol, acetone and diethyl ether and conserved for further use.

2. Preparation of Graphene (Gr) from Graphene Oxide (GO).

Graphene oxide (GO) was loaded on the alumina boat which was placed in the quartz tube. Further, the tube was kept in tubular furnace and the tube was saturated with inert atmosphere by purging Ar with the flow rate of 0.5 sccm. Further, the temperature of the furnace was increased to 900° C. and the same temperature was maintained for 3 h. This was allowed to cool to room temperature after pyrolysis with Ar flow. The pyrolysed product was preserved for further studies.

3. Preparation of Porous Graphene (pGr) and Graphene Quantum Dots by Hydrogen Peroxide ($H_2O_2$) Functionalization of Gr.

100 mg of Gr of example 2 was dispersed in 100 ml of $H_2O_2$ (30%) at room temperature (30° C.) and temperature of the reaction mixture was increased to 70° C. and maintained for 72 h. Subsequently, the resulting mixer was filtered by filter paper (filter paper 0.44 μm pore size, Rankem) to obtain porous graphene pGr-72 as residue which was dried at 50° C. for 3 h and preserved for further analysis. Total yield of pGr-72 was estimated which is ~70%. The filtrate so obtained was allowed for dialysis in a dialysis bag for 3 days (at 30° C.). The resulting photoluminiscent aqueous solution of graphene quantum dots (GQD-72) was conserved for further analysis. Photoluminescent Yield: 15.8%.

For the comparative study, the set of pGr-48 & GQD-48 and pGr-24 & GQD-24 were prepared by changing the duration of the functionalization by 48 and 24 h respectively.

4. Preparation of Nitrogen Doped Porous Graphene (NpGr-72)

50 mg of pGr as prepared in example 3 in ethanol solution (amount of ethanol) was mixed with 100 mg of 1,10 Phenanthroline (phen) in ethanol amount of ethanol and the reaction mixer was kept for mechanical stirring for 24 h at temp?? to attain the well diffusion of phen into the cavity of the pGr. The solvent was evaporated by thermal evaporation at 50° C. for 3 h. Subsequently, the resulting composite material was loaded on alumina boat placed in the quartz tube. Then, the tube was kept in tubular furnace saturated with inert atmosphere by purging Ar with the flow rate of 0.5 sccm. Further, the temperature of the furnace was increased up to 900° C. and the same was maintained for 3 h. The pyrolysed product (NpGr-72) was cooled, washed with ethanol and preserved for further studies. Yield: 90%. The nitrogen doping on the final product (NpGr-72) was ensured by EDAX and XPS analysis.

CHARACTERIZATION 5.1 HRTEM Analysis.

The structure and morphology of Gr, pGr and GQDs were explored with help of HRTEM analysis. FIGS. 1a and 1b represent the transmission electron microscopy (TEM) images of GQD-72. FIG. 1a depicts uniform dispersion of GQDs with an average size of ca 3-5 nm. The diffraction pattern (inset of FIG. 1a) and higher magnification image (inset of FIG. 1b with a d value of 0.24 nm (1120 plane of graphene) emphasize the higher crystallinity possessed by GQD-72 which is very much similar to the parent graphene. The TEM images of pGr-72, as shown in FIG. 1c-d clearly reveal the presence of nano sized pores on Gr surface which were absent in the case of pure Gr sheets (FIG. 1e-f). The 5 nm average sized pores were in well accordance with the average size of GQD-72 which highlights the derivation of these GQDs from the Gr surface.

5.2 Optical Property Study; UV-vis Spectra and Photoluminiscent Spectra (PL) of GQD-72.

FIGS. 2a to c depict the optical properties of GQD-72. The UV-Vis spectrum of GQD-72 in water (FIG. 2a) showed two absorption bands at 300 and 340 nm ensuring the two electronic transitions occurring under the UV light. The aqueous solution of GQD-72 showed a yellow color (inset of FIG. 2a) and emitted a strong green luminescence under the UV light which was likely to be due to the luminescent carbon particles. FIG. 2b depicts the photoluminescent (PL) spectra of GQD-72. The PL spectra of GQD-72 showed the strongest emission at 457 nm with the Stokes shift of 117 nm on an excitation wavelength of 340 nm. Besides, the PL peak position was red shifted from the lower wavelength to higher wavelength with reduction in intensity by change in the excitation wavelength from 340 to 460 nm, elucidating the excitation dependent PL behaviour of GQD-72. The photoluminecent excitation (PLE) spectrum in FIG. 2c showed two sharp peaks at 301 and 340 nm as similar to the UV-Vis spectra, which further confirmed the two transitions under the UV light. The UV-Vis spectra and PLE clearly reveal that the observed green luminescence was mainly, due to the transitions at 300 (4.12 eV) and 340 nm (3.65 eV) i.e. the transitions from the σ and π orbital in the highest occupied molecular orbital (HOMO) to the lowest unoccupied molecular orbital (LUMO). Further, the calculated ΔE for the green luminescence was 0.47 eV, which ensures that the synthesized GQD was similar to the carbene with triplet multiplicity. FIG. 2d depict the comparison of the PL spectra of GQD-24, 48 and 72 excited at 340 nm.

5.3 XRD and Raman Spectra Analysis

The crystalline nature of Gr, pGr-72, NpGr-72 and GQD-72 was inferred from the XRD pattern of FIG. 3a. Gr, pGr-72 and NpGr-72 showed sharp graphitic peaks of the (002) plane centered at 2 θ of 25.7° whereas GQD-72 showed a broader peak with a shift in the 2 θ to 23.1°, indicating the reduced size of GQDs. The d-spacing also increased from Gr to GQD (3.53 to 3.61 Å) due to the intercalation of oxygen functional groups which results in enhanced interlayer distance. A similar d-spacing shift is also expected in the case of pGr-72 due to the oxygen functionalities. However, the relative oxygen to carbon content ratio is more in the case of GQD over pGr due to its small particle size (~5 nm).

Hence, the extent of oxygen intercalation was expected to be in a significant range to make an apparent shift of the G (002) plane in XRD. In addition to XRD, Raman spectroscopy was also employed to characterize the graphitic nature of GQD and the Gr based samples (FIG. 3b). The peaks at 1584-1589 $cm^{-1}$ which corresponds to the graphitic peak (G band) was mainly due to the $E_{2g}$ vibrational mode of the C—C bond stretching. The peak at 1337-1346 $cm^{-1}$ indicates the disorder, which was due to the $A_{1g}$ vibrational mode of C. The extent of defects present on the Gr based samples and GQD-72 was estimated with respect to the $I_D/I_G$ ratio and the resulted values were 0.77, 1.03 and 1.1 for Gr, pGr-72 and GQD-72 respectively. The higher $I_D/I_G$ ratio of pGr-72 compared to Gr was due to the porosity associated with the functional groups present on pGr-72.

6. Electrochemical Studies: Cyclic Voltammetry (CV)

Figure 4:
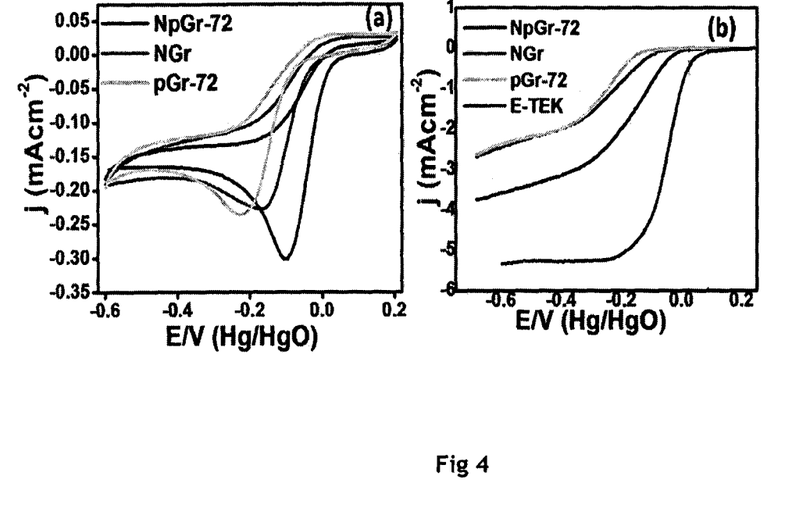
FIG. 4 depicts (a) CV for pGr-72, NGr and NpGr-72 in 5 m V s$^{-1}$ scan rate. (b) Linear sweep voltammograms of pGr-72, NGr, NpGr-72 and E-TEK recorded in 0.1 M KOH with the scan rate of 10 m V s−1 and electrode rotation rate of 1600 rpm.

To determine the influence of surface porosity of Graphene (Gr) for nitrogen doping towards the establishment of efficient catalytic sites for ORR, cyclic voltammetry (CV) was performed for NpGr-72 in 0.1 M KOH solution (saturated with $O_2$) and the performance was compared with non-porous nitrogen doped graphene (NGr), pGr-72, Gr and commercial 20 wt % Pt/C (E-TEK). FIG. 4a compares the cyclic voltammograms of NpGr-72, NGr, pGr and Gr taken at a potential window of 0.2 to −0.6 V against Hg/HgO reference electrode at a scan rate of 5 mV $s^{-1}$. The voltammograms clearly showed that the ORR activity of all the samples as indicated by the distinct onset potentials and peaks correspond to oxygen reduction current during the cathodic scan. Gr showed a well resolved cathodic peak corresponding to ORR with an onset potential of −0.088 V under oxygen saturated conditions whereas pGr-72 showed the ORR with an onset potential of −0.07 V. The more positive onset potential shift occurred in the case of pGr-72 which can be ascribed to the presence of functional groups on the edge sites along the pore openings of Gr. In the case of NGr, the onset potential was shifted favorably in the positive direction with the onset at −0.03 V, which clearly validates the influential role of nitrogen towards ORR in the system. The CV profile of NpGr-72 showed a substantial reduction in the overpotential and increased peak current for ORR compared to NGr. NpGr-72 exhibited the cathode current onset at +0.02 V, which corresponds to an appreciable reduction in the overpotential by 50 mV compared to its nonporous nitrogen doped counterpart (i.e. NGr).

7. Accelerated Durability Test for (a) NpGr-72 and (b) 20 wt % Pt/C (E-TEK)

Figure 5:
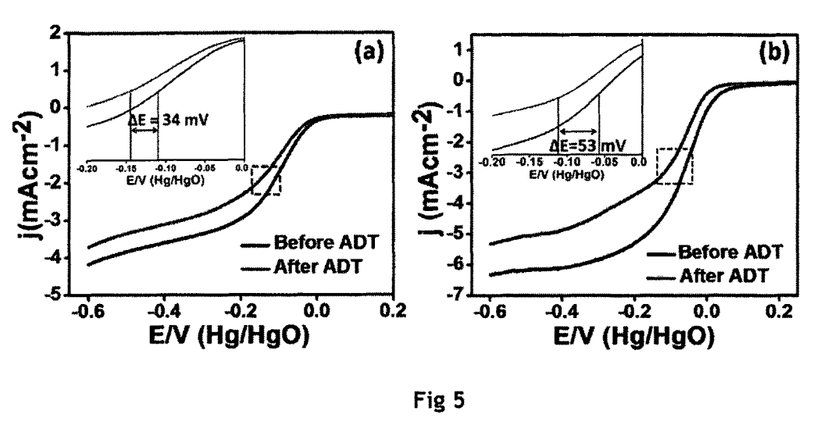
FIG. 5 depicts accelerated durability test for (a) NpGr-72 and (b) 20 wt % Pt/C (E-TEK).

The stability of the non-Pt catalysts under electrochemical environments is an important assessment criterion of their suitability in real fuel testing conditions. Hence, in order to compare the stability of NpGr-72 with respect to the well known E-TEK, the present inventors carried out the accelerated durability test (ADT) as shown in FIG. 5. ADT was implemented by potential cycling of desired material between −0.85 and 0.4 V vs Hg/HgO in oxygen saturated 0.1 M KOH at a scan rate of 100 mV s−1 for 2500 cycles. Earlier, the LSV was taken at 1600 rpm to envisage its' original ORR performance. After 2500 cycles, i.e., after the ADT, LSV was repeated again and the degree of degradation was quantified by comparing the half wave potential of the catalyst before and after ADT. The potential drop for NpGr-72 was 34 mV which was significantly lower than that of Pt/C (53 mV). Thus, the LSV comparison plots before and after ADT evidently showed that NpGr-72 was electrochemically more stable compared to its commercial Pt counterpart in alkaline medium. Obviously, the potential cycling caused the dissolution and sintering of Pt nanoparticles in the case of E-TEK whereas degradation of active sites in NpGr-72 was less prominent due to the stable coordination of nitrogen with the graphene moiety.

8. Single Cell Polarization Test

Figure 6:
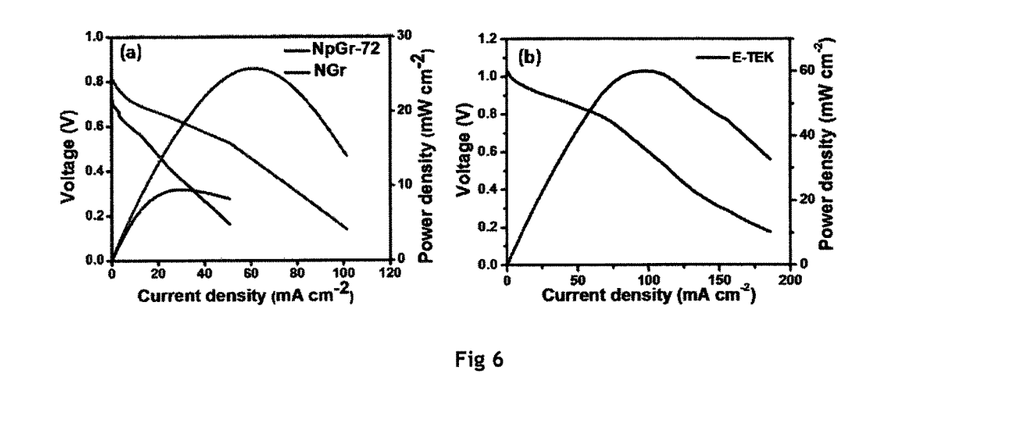
FIG. 6 depicts (a) Single cell polarization data by using NpGr-72 and NGr (b) Pt/C (E-TEK) as the cathode catalysts (loading: 2.5 mg cm−2) and FumaTech FAA as the anion exchange membrane. 40 wt. % Pt/C (E-TEK) (loading: 0.8 mg cm−2) was used as the anode catalyst. The operating temperature is 50° C. H2 and O2 flow rates are 50 and 100 sccm respectively and 100% relative humidity was maintained for the H2 and O2 streams.

The demonstration of real fuel cell performance is an important criterion to direct non-Pt electrocatalyst towards the practical application. The single cell polarization performance of the present catalyst was evaluated under anion exchange membrane fuel cell conditions (AEMFCs) (FIG. 6a). The membrane electrode assembly (MEA) was made by sandwiching NpGr-72 or NGr coated (2.5 mg $cm^{-2}$) gas diffusion layer (GDL) in cathode side and E-TEK coated GDL in anode side with FumaTech FAA membrane. In all the cases, 40 wt % Pt/C with a loading of 0.8 mg $cm^{-2}$ was used as the anode catalyst. The MEA derived from NpGr-72 exhibited an open circuit potential (OCP) of 0.82 V which was slightly higher than the OCP value of 0.73 exhibited by NGr. NGr exhibited a current density of 26.3 mA $cm^{-2}$ at 0.4 V whereas NpGr-72 gave a value of 67.3 mA $cm^{-2}$ which was two times higher than that of NGr. In addition, NpGr-72 displayed a maximum power density of 27 mW $cm^{-2}$ which was significantly higher than the corresponding value obtained on NGr (10 mW $cm^{-2}$). With the maximum current density at 0.4 V (129.3 mA $cm^{-2}$) and power density (67 mW $cm^{-2}$), 40 wt. % Pt/C (E-TEC) however outperformed NpGr-72 (FIG. 6b) which was however an obvious performance. The single cell data of Pt/C was in well agreement with the literature report [J. R. Varcoe, R. C. T. Slade, G. L. Wright, Y. Chen, J. Phys. Chem. B 2006, 110, 21041] The AEMFC performance of the present catalyst was nearly comparable to the one reported on nitrogen doped CNT, even though the electrode catalyst loading in this case was 5 mg cm$^{-2}$ compared to 2.5 mg cm$^{-2}$ in the present case.[ [C. V. Rao, Y. Ishikawa, J. Phys. Chem. C 2012, 116, 4340]

9. Hydrogen Adsorption Desorption Isotherms of pGr-48 and pGr-72

Figure 7:
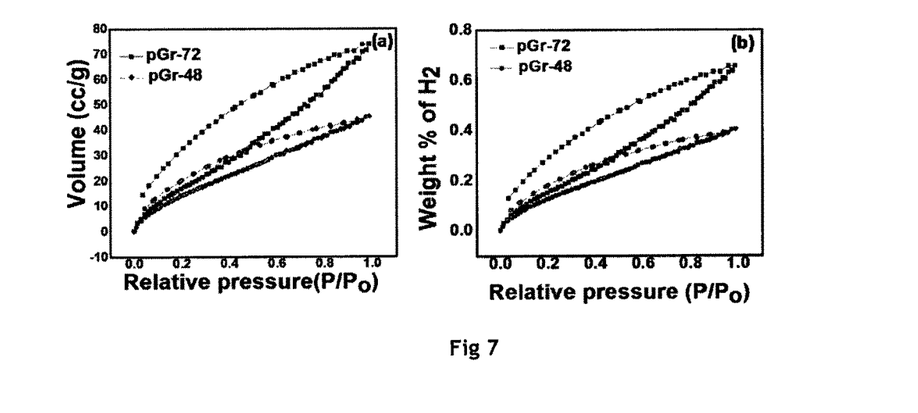
FIG. 7 depict Hydrogen adsorption desorption isotherms of pGr-48 and pGr-72 at 1 atm pressure and 77 K and (b) weight percentage of hydrogen uptake of pGr-48 and pGr-72 at 1 atm pressure and 77 K.
Figure 8:
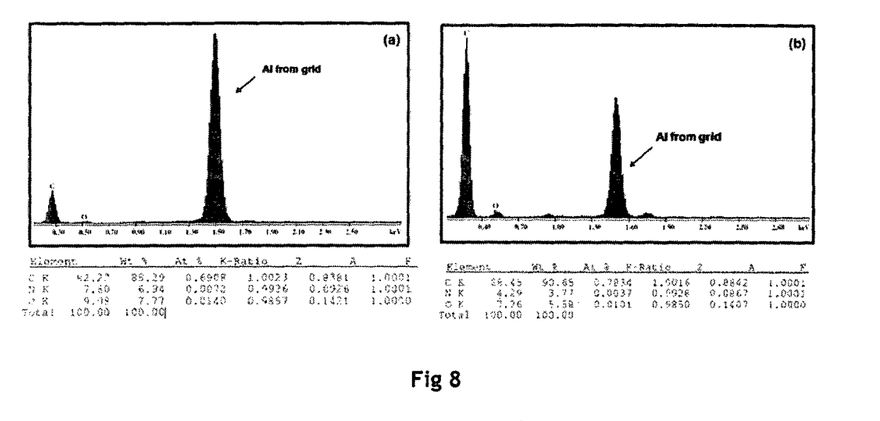
FIG. 8 EDAX spectra with elemental quantification of (a) NpGr-72 and (b) NGr. It depicts the higher amount of the doped nitrogen and its chemical environment of NpGr-72 has been identified by energy dispersive X-ray analysis (EDAX).

An adsorption study using hydrogen as the probe molecule was carried out as smaller pores were expected to bring in higher hydrogen storage capacity to the system. FIG. 7a, compares the hydrogen adsorption-desorption curves for pGr-48 and 72. The pGr-based samples showed a weak desorption behavior for $H_2$ due to the strong interaction between the $H_2$ and functional groups present (i.e. chemisorption) on Gr. Moreover, the weight percentage (wt. %) of the $H_2$ uptake for pGr-48 and 72 was calculated (FIG. 7b) and the resulted values were 0.45 and 0.73 wt. % respectively which were relatively lower than the previously reported value for Gr with a surface area of 1550 m$^2$ g$^{-1}$ (3 wt %).[A. Ghosh, K. S. Subrahmanyam, K. S. Krishna, S. Datta, A. Govindaraj, S. K. Pati, C. N. R. Rao. J. Phys. Chem. C. 2008, 112, 15704] However, the hydrogen storage capacity of pGr-72 was nearly two times higher than that of pGr-48 which ensures the better surface density of the smaller pores present on pGr-72.

ADVANTAGES OF THE INVENTION

Previous methods synthesized the quantum dots by cutting down the carbon source into the small quantum dots and excluded their resulting parent carbon source. The present method provides nanoporous graphene and graphene quantum dots simultaneously by hydrogen peroxide oxidation. These nanoporous graphene was effectively utilized for nitrogen doping for oxygen reduction reaction.

The process offers a viable and facile route for converting Gr simultaneously into two potentially important materials viz pGr and GQDs.

The yield of the quantum dots is significantly more (15.8%) than the previous reports.

The holes on the porous Gr are expected to provide more edge sites which are believed to act as a trapping site for other heteroatom doping as well (boron B and Phosphorous P).

The Gr with well distributed nano pores can also be effectively utilized as a membrane for gas separation, water desalination, Li-ion storage in Li-air battery.

The nitrogen doped porous graphene exhibits ORR with overpotential difference of 80 mV with in comparison of 20 wt % Pt/C which is significantly less than the previous reports.

This approach is simple, cheaper and scalable.

We claim:

1. An in-situ process for simultaneous synthesis of nanoporous graphene (pGr) and photo luminescent graphene quantum dots (GQDs) with no wastage of carbonaceous material comprising;
    i. dispersing graphene with 25-35% hydrogen peroxide ($H_2O_2$) at room temperature ranging between 25-35° C. followed by increasing the temperature to 60 to 70° C. for 24 to 72 hrs to obtain a mixture of porous graphene (pGr) and graphene quantum dots (GQDs);
    ii. filtering the resulting mixture to obtain the solution of GQDs as filtrate and residue of pGr;
    iii. drying the residue as pGr as obtained in step (ii) at a temperature in the range of 40° C.-60° C. for 1-3 h;
    iv. dialysing the filtrate as obtained in step (ii) in dialysis bag for 1-3 days at 27 to 30° C. to obtain solution of GQD;
    v. nitrogen doping of the porous graphene as obtained in step (iii) to obtain nitrogen doped porous graphene.

2. The process according to claim 1, wherein the average size of graphene quantum dots as obtained in step (iv) in a single layer is 3-5 nm.

3. The process according to claim 1, wherein the BET surface area of pGr as obtained in step (iii) is in the range of 204 to 240 m$^2$ g$^{-1}$.

4. The process according to claim 1, wherein the nitrogen doping of the porous graphene surface (pGr)was carried out by, mixing of ethanolic solution of porous graphene (pGr) as obtained in step (iii) with 1, 10 Phenanthroline mixture at 27 to 30° C. for a period ranging between 20-24 hrs followed by evaporating the solvent by thermal evaporation at temperature ranging between 50 to 60° C. for a period ranging between 10-12 hrs to obtain the composite material subsequently heating at temperature ranging between 800 to 900° C. for a period ranging between 1-3 hrs in a furnace saturated with inert atmosphere and cooling, washing to obtain nitrogen doped porous graphene.

5. The process according to claim 4, further comprising at least one of:
    performing gas separation using the nitrogen doped porous graphene nano pores (pGr);
    performing water desalination using the nitrogen doped porous graphene nano pores (pGr);
    performing single atom doping (Pt, Co and In) using the nitrogen doped porous graphene nano pores (pGr); or
    manufacturing Li-ion batteries Li-air battery, solar cells, super capacitors, gas sensors or polymer electrolyte membrane fuel cells (PEMFCs) using the nitrogen doped porous graphene nano pores (pGr).

\* \* \* \* \*